June 7, 1932.  R. D. HICKOK ET AL  1,861,697
MEASURING AND RECORDING INSTRUMENT
Filed May 29, 1929  2 Sheets-Sheet 1

INVENTOR
ROBERT D. HICKOK
AND
WARNER H. RENNICK
BY
Brockett, Hyde, Higley & Meyer
ATTORNEYS Patented June 7, 1932

1,861,697

UNITED STATES PATENT OFFICE

ROBERT D. HICKOK AND WARNER H. RENNICK, OF CLEVELAND, OHIO

MEASURING AND RECORDING INSTRUMENT

Application filed May 29, 1929. Serial No. 366,938.

This invention relates to measuring and recording instruments, and particularly to the more delicate or finer class of instruments, including electrical instruments, such as ammeters, voltmeters, or the like. The object of the invention is to provide means whereby a fine and delicate measuring instrument may be made to produce a permanent record or trace over a period of time, but without interfering with its normal measuring and indicating ability or affecting its accuracy or harming its operating parts.

Further objects of the invention will be in part obvious and in part will appear more in detail hereinafter.

Figure 1:
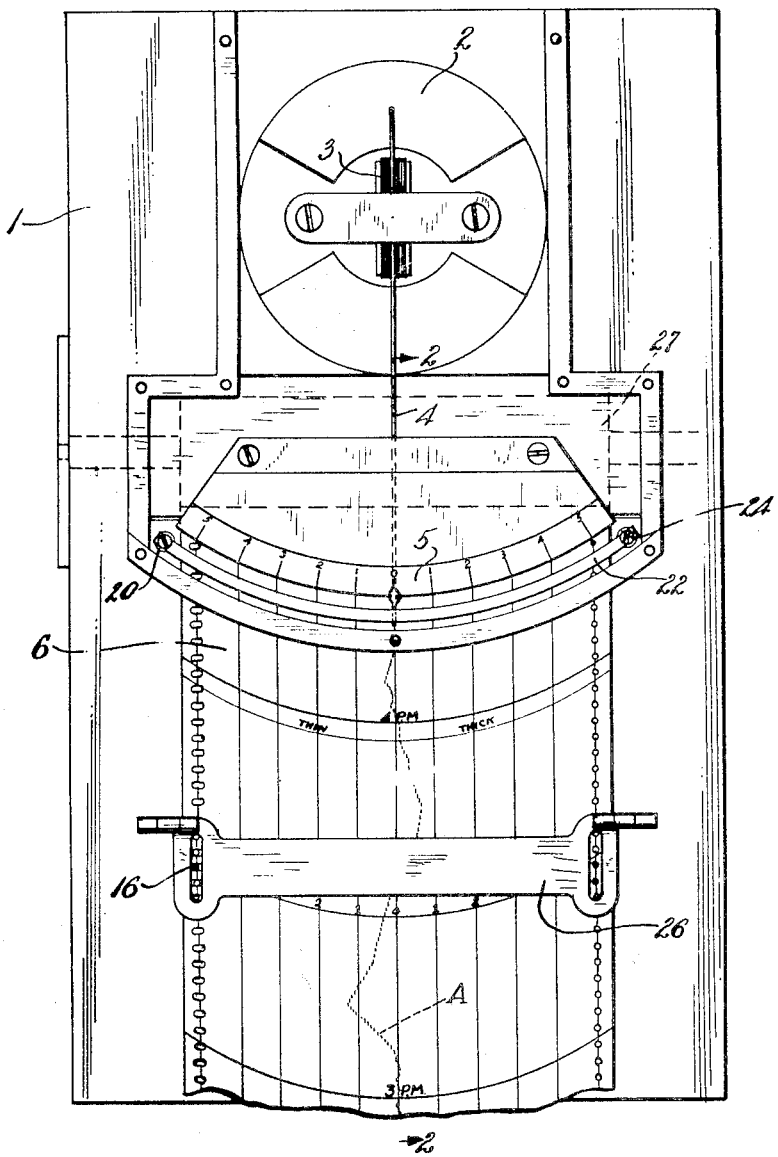
Figure 2:
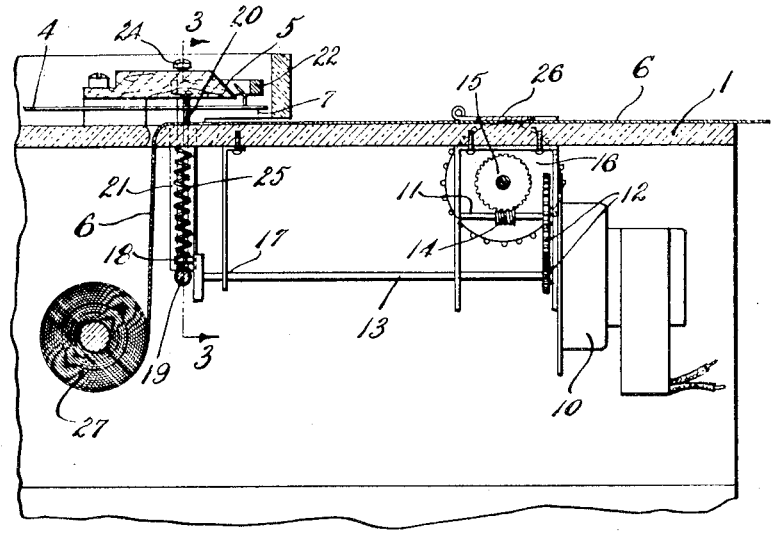
Figure 3:
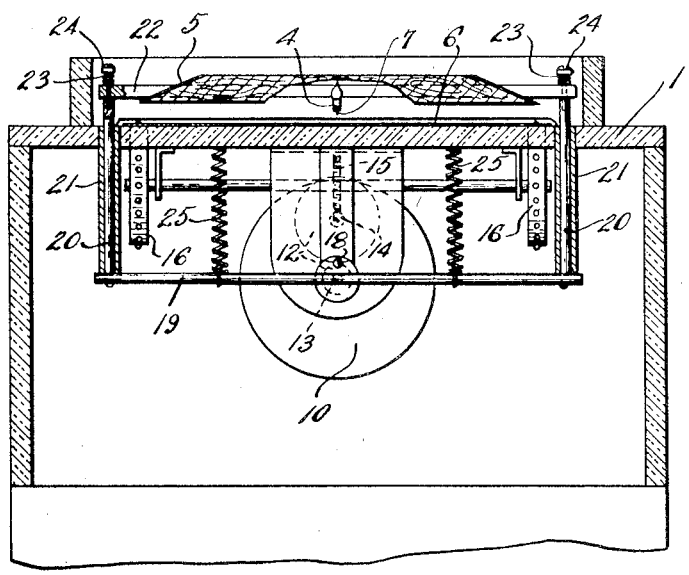

In the drawings, which represent one suitable embodiment of the invention, Fig. 1 is a plan view; Fig. 2 is a longitudinal sectional elevation on the line 2—2, Fig. 1; and Fig. 3 is a cross section on approximately the line 3—3, Fig. 1.

The finer types of measuring instruments,—those in which extreme and minute accuracy is essential,—have never been particularly suitable or adapted for use as recorders, due to the fact that the moving pointer,—usually a swinging hand or needle,—is of very light weight and is delicately mounted in finely jewelled bearings. It cannot be treated roughly. In some types of delicate measuring instruments, such as the electrical instruments above referred to, the moving parts of the pointer must be freely suspended to travel in a gaseous medium, such as air. The slightest contact, other than through the bearings, with other materials, interferes with or impedes the motion and destroys accuracy. As a result, the pointers of such instruments cannot be made to continuously wipe or drag across a sheet of paper upon which a trace may be made by a pen or pencil carried by the pointer. The pointer and the attached pen or pencil are too heavy and the continuous drag upon the paper is a load that cannot be overcome in these instruments with accompanying accuracy. Again, it is not possible successfully to provide the pointer with a stylus which may be periodically poked through the paper to puncture it, because that operation requires a sufficiently strong pointer and stylus and thereby unduly increases the weight and the strain upon the bearings, and the manipulation of the pointer to puncture the paper is destructive upon the bearings. Likewise, those attempts to secure recording effects by providing the pointer with a contact point from which a spark is periodically arced to a fixed electrode to thereby puncture the paper by a burning effect have also been unsuccessful, because not only is the paper record so torn or burned or mutilated that it cannot be preserved, but also the contacts gather lint and fibres of the paper and may even become corroded, due to electrostatic and other effects, so that the instrument soon becomes sluggish and inaccurate.

According to the present invention, the pointer, as is usual in these fine, delicate instruments, is made of any suitable length, say six inches or so, so as to have any desirable wide swing, but is nevertheless made very light in weight so that the strain upon its bearings is a minimum. It is mounted to travel freely through a gaseous medium, such as air, and out of actual contact with other parts except through the bearings and at times when a record trace is being made. The pointer carries a stylus or marker, which is periodically brought into very light contact with a suitable paper or other record, not for the purpose of puncturing the same, but to merely touch its surface, and the touch may be very light so that the stylus can also be light and need not be strong. As a result, the instrument normally operates with the extreme accuracy desirable and necessary and at intervals the pointer is very slightly flexed, with a travel of an eighth of an inch or so at its extreme end, to produce the trace, but without destructive or harmful effects upon the bearings and without interfering with accuracy. The drawings show one instrument suitable for the purpose.

The instrument illustrated comprises a suitable casing or frame 1 in which is mounted the mechanism for moving the pointer, which may be of any suitable form, but which will be understood to be capable of indicating minute changes by travel of the pointer. The drawings show an electrical instrument including a stationary coil 2 and a rotating coil 3, the latter being attached to the pointer 4, which is mounted in jewelled bearings (not shown) and has its outer free end travelling across or over a suitable scale 5 to indicate variations in the effect being measured. In the arrangement shown the needle travels about a vertical axis and its free end is freely suspended in the air and moves horizontally in an arc over the upper flat surface of the box or casing 1, the scale being suitably mounted above it.

The record is made upon a strip or band 6 of paper of special form well known in the art and provided with a prepared surface in two layers, a light layer over a dark layer. Application with light pressure of a stylus to the surface of this moving paper sheet abrades or wipes off the upper light layer and leaves the darker layer exposed to form a record trace. For this purpose the needle or pointer has its outer free end provided with a downwardly extending small teat or tongue 7 forming a stylus and lying immediately over the surface of the paper.

Means is also provided for uniformly moving the paper record to produce the time element, as well as to periodically apply the stylus to the paper to produce the trace. This operating mechanism is driven in any suitable manner, such as by clock-work, although the drawings show a synchronous motor and reducing gearing, marked generally 10, and arranged to drive a shaft 11 coupled by the gears 12 to a shaft 13. The shaft 11 is provided with a worm 14 engaging a worm wheel 15 upon a cross shaft provided with sprockets 16 arranged to engage holes along the edges of the paper sheet and advance the latter continuously past the stylus. The shaft 13 extends rearwardly in the casing and has its rear end mounted in a bearing 17 and provided with a small crank 18 lying above a cross bar 19 connecting two posts 20 slidable vertically in sleeves 21. The posts 20 at their upper ends extend through holes in a pressure bar 22 curved in plan view, as shown in Fig. 1, so that it lies above the stylus throughout the full arc of travel of the needle or pointer. Above the bar 22 are two light springs 23 held in place by nuts 24 on the ends of the posts 20, and the rectangular frame including members 19, 20, and 22 is normally moved upwardly by the tension springs 25. A cover or guard 26 may be located above the paper driving sprockets to protect the same and also to hold the paper down to the flat base along which it travels, while 27 indicates generally the paper roll suitably mounted within the casing and of course so mounted as to enable it to be readily removed or changed when necessary.

In this instrument the operating parts for the needle or pointer operate as usual, and in the instrument shown the pointer travels back and forth through its arc of movement across the paper by the interaction between the stationary and movable coils. Its position laterally across the sheet therefore signifies the value of the particular quality being measured and said value is indicated upon the scale 5 by proper calibration and marking thereof.

The gearing and the driving means therefor, such as a clock or the synchronous motor shown, is arranged to cause slow uniform travel of the paper record and periodic depression of the pressure bar. The amount of travel of the paper in a given unit of time and the periodicity of depression of bar 22 may be of any amount. In the arrangement shown the gearing is such that the shaft carrying the crank 18 rotates four times per minute, with a consequent depression of bar 22 every fifteen seconds, and the relation between the crank 18 and bar 19 is such that the stylus, at each depression thereof, is in contact with the paper for about five seconds and out of contact with it for ten seconds. It is therefore in contact with the paper one third of the time and the other two-thirds of the time allows intervals of sufficient length to enable the pointer to readjust itself to a new position. The gearing to the sprockets 15 is such that the sprockets rotate once per hour with a travel of the paper of five or six inches per hour. The paper travel is, of course, uniform and continuous. Four times each minute the bar 22 is depressed and whatever be the position of the pointer and stylus the latter is depressed very lightly into contact with the paper which lies against a rigid backing formed by the top surface of the box or casing 1. During the five seconds while it is in contact with the paper the latter advances a short distance and a very small trace is made by abrading or wiping off the upper layer of the prepared surface. The pressure of the stylus upon the paper is limited or adjusted by adjusting the pressure of the light springs 24 and is made so light that injury to the pointer or its bearings is avoided. The pointer itself may be made, for example, of very small light aluminum tubing, which in six inches or so of length will suffer a bending effect of an eighth of an inch or so without strain upon the bearings.

A characteristic trace of this recording instrument is indicated in small magnified form by the dotted line A.

What we claim is:

In a delicate measuring and recording instrument, including means for moving a record sheet and a movable indicating and recording pointer of relatively light weight and slightly resilient; operating means for said pointer including a source of power arranged to apply thereto a moving effect no more than sufficient to move it freely through a gaseous medium, said pointer having a stylus portion freely movable in the air, said record sheet being out of contact with the stylus and having a surface which is removable to produce a legible trace, and means normally out of contact with the pointer and arranged to yieldably engage the same at intervals to lightly apply the stylus to the record sheet to abrade its surface and produce a legible trace thereon.

In testimony whereof we hereby affix our signatures.

ROBERT D. HICKOK.
WARNER H. RENNICK.